UNITED STATES PATENT OFFICE.

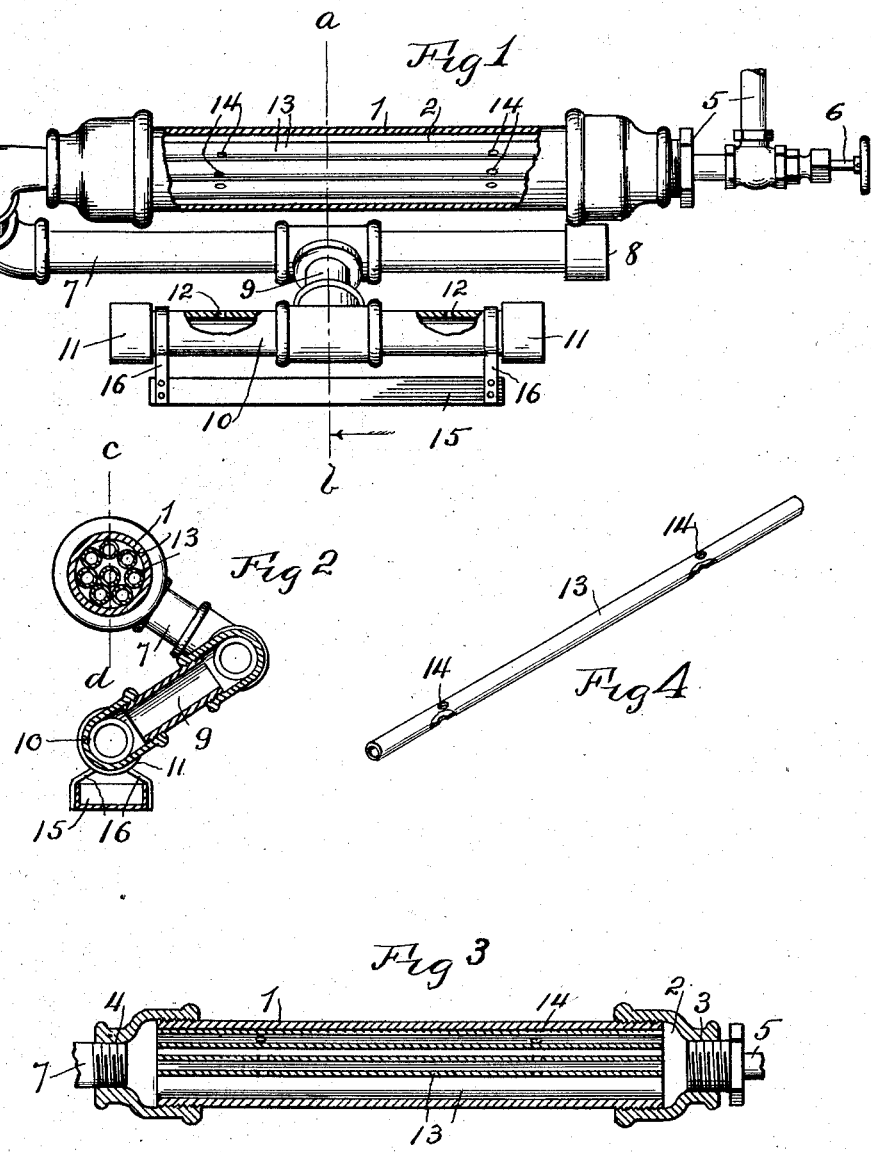

PETER J. RINGLER, OF WICHITA, KANSAS.

OIL-BURNING APPARATUS.

1,012,160.  Specification of Letters Patent.  Patented Dec. 19, 1911.

Application filed April 29, 1911. Serial No. 624,102.

*To all whom it may concern:*

Be it known that I, PETER J. RINGLER, a citizen of Wichita, in the county of Sedgwick and State of Kansas, have invented certain new and useful Improvements in Oil-Burning Apparatus, of which the following is a specification.

My invention relates to improvements in oil-burning apparatus.

The object of my invention is to provide a simple and efficient oil burning apparatus which will produce a steady flame or flames and which will effect complete combustion when used to burn the ordinary commercial oils.

The novel features of my invention are hereinafter fully described and claimed.

In the accompanying drawings which illustrate one form of my invention, Figure 1 is a view partly in side elevation and partly in vertical section of my improved oil burning apparatus. Fig. 2 is a cross section on the line $a$—$b$ of Fig. 1. Fig. 3 is an enlarged longitudinal sectional view on the line $c$—$d$ of Fig. 2. Fig. 4 is a perspective view, partly broken away, of one of the vaporizing tubes.

Similar reference characters designate similar parts.

1 designates a horizontal casing of any suitable form and having a vaporizing chamber 2, an oil inlet 3 and a gas outlet 4. Said inlet and outlet are preferably located at opposite ends of the casing 1. A conductor 5 provided with a suitable shut off cock 6 is connected at one end with a suitable source of oil supply, not shown, the other end of the conductor communicating with the inlet 3. A conductor 7 has one end closed by a cap 8, the other end communicating with the gas outlet 4. The conductor 7 is provided intermediate of its ends with a branch 9 which discharges into a suitable burner comprising preferably a horizontal tube 10, the ends of which are respectively closed by caps 11, and which is connected, preferably midway between the caps 11, to the branch 9. Preferably the burner tube 10 is disposed parallel with and directly beneath the casing 1 and is provided in its upper side with one or more discharge openings 12 by which the flames are discharged against the underside of the casing 1, for the purpose of vaporizing oil entering the chamber 2 from the conductor 5.

For more rapidly and thoroughly vaporizing the oil which enters the chamber 2, I preferably mount in said chamber a plurality of parallel tubes 13, preferably circular in cross section, and having open ends. Said tubes 13 are preferably disposed longitudinally in the chamber 2 between the inlet 3 and the outlet 4, so that oil may enter one set of ends and gas be discharged from the other set of ends of said tubes.

In order that the oil and gas contained in the tubes 13 may be discharged laterally against the side walls of the casing and against the side walls of the adjacent tubes, 13, each tube 13 is preferably provided with one or more lateral perforations 14. For initially heating the burner and the casing 1, I provide a drip pan 15 which is suspended below the tube 10 by means of straps 16.

In operating my invention, the cock 6 is opened so as to permit oil to flow through the conductor 5, casing 1, tubes 13, conductor 7, branch 9, tube 10 and openings 12 and into the drip pan 15. The oil collected in the drip pan is then ignited, and in burning heats the burner tube 9 and casing 1 so as to effect the preliminary generation of gas in the chamber 2 in the usual manner. The gas formed in the tubes 13 and chamber 2 passes into the burner tube 10 by way of conductor 7 and branch 9, and after issuing from the openings 12, is ignited, and in burning provides sufficient heat to vaporize oil in the chamber 2 and tubes 13, thereby rendering the operation continuous. Air and gas in the portion of the conductor 7 between the cap 8 and branch 9 becomes compressed, by the pressure of the gas generated in chamber 2 and passing into the conductor 7, thereby effecting an even discharge of gas from the discharge openings 12 so as to produce flames which burn steadily and without undue and annoying noise or puffing sounds due to fluctuations of pressure in the gas supplied to the burner.

I do not limit my invention to the structure shown and described, as many modifications, within the scope of the appended claims, may be made, without departing from the spirit of my invention.

By employing the vaporizing tubes 13 instead of the usual solid rods or wires, the vaporizing surface is largely increased and the oil and gas in chamber 2 is more highly and more quickly heated than would otherwise be the case.

Having thus described my invention, what I claim and desire to secure by Letters Patent, is:—

1. An oil burning apparatus having a burner, a casing having a vaporizing chamber disposed so as to be heated by the burner flame, and having an oil inlet and a gas outlet, a conductor having a closed end and having its other end communicating with said outlet and having a branch discharging into the burner and disposed between the ends of the conductor, whereby a compression chamber is provided between the branch and said closed end, and a plurality of tubes having open ends and disposed longitudinally in said chamber between said inlet and outlet, said tubes each having a lateral perforation.

2. An oil burning apparatus having a burner tube closed at its ends and provided with a lateral discharge opening, a casing having a vaporizing chamber disposed so as to be heated by flames from said discharge opening and having an oil inlet and a gas outlet, a conductor having a closed end, the other end communicating with said outlet, the conductor having a branch discharging into the burner tube between the ends of said tube and located between the ends of the conductor, whereby a compression chamber is provided between the branch and the closed end, and a plurality of tubes having open ends and disposed longitudinally in the chamber between the inlet and outlet, each of the tubes in the chamber having a lateral perforation.

In testimony whereof I have signed my name to this specification in presence of two subscribing witnesses.

PETER J. RINGLER.

Witnesses:
E. P. TRUMAN,
GRANT BALLANTINE.

Copies of this patent may be obtained for five cents each, by addressing the "Commissioner of Patents, Washington, D. C."